United States Patent Office 2,786,804
Patented Mar. 26, 1957

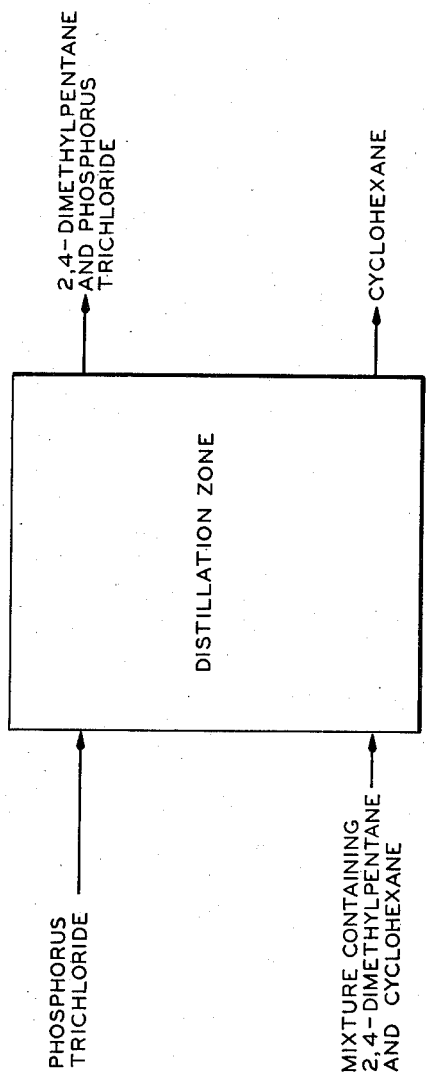

2,786,804

DISTILLATION SEPARATION OF ALIPHATIC AND NAPHTHENIC HYDROCARBONS EMPLOYING PHOSPHORUS HALIDES

William T. Nelson, Bartlesville, Okla., assignor to Phillips Petroleum Company, a corporation of Delaware Application September 28, 1954, Serial No. 458,979

13 Claims. (Cl. 202—42)

This invention relates to the separation of close-boiling hydrocarbons employing for the purpose a phosphorus halide. In one of its aspects, the invention relates to the separation of a mixture containing aliphatic and naphthenic hydrocarbons which have closely similar boiling points and/or which form azeotropes. In another aspect of the invention the separation of close-boiling naphthenic and paraffinic hydrocarbons, employing a phosphorus halide, is accomplished. In a specific embodiment of the invention the purification of cyclohexane, a product of increasing and presently great importance in the chemical arts, is accomplished employing phosphorus trichloride.

The several objects, other aspects and the advantages of the invention are apparent from this disclosure and the claims appended thereto.

In the various ways of processing hydrocarbons, there will frequently be encountered mixtures of hydrocarbons which are difficult to separate into specific components by ordinary fractional distillation procedures because of small differences in boiling points. For example, cyclohexane, which has a boiling point of 177.3° F., is not readily separated from a mixture comprising, 2,2-dimethylpentane, 2,4-dimethylpentane, and/or 2,2,3-trimethylbutane, which have boiling points of 174.6, 176.9, and 177.6° F., respectively. Commonly employed processes for separating such close boiling components are azeotropic distillation or extractive distillation. In these processes, the hydrocarbon mixture is distilled in the presence of an added substance which has a preferential affinity for one of the hydrocarbon components in the fraction and thereby changes the relative volatilities of the hydrocarbons to such an extent that separation by fractional distillation is feasible. Heretofore, benzene has been used as an entrainer for separating cyclohexane from a mixture of paraffinic hydrocarbons comprising 2,2-dimethylpentane, 2,4-dimethylpentane, and 2,2,3-trimethylbutane in an azeotropic distillation process; however, the use of an improved entrainer which would result in a more effective separation process is desirable.

According to the present invention, there is provided an improved entrainer for effecting the separation of aliphatic and naphthenic hydrocarbons from paraffinic hydrocarbons having small differences in boiling point by an azeotropic distillation process, said entrainer comprising a phosphorus halide. According to one embodiment of the present invention, a hydrocarbon mixture of naphthenic hydrocarbons and paraffinic hydrocarbons is distilled in an azeotropic distillation process using a phosphorus halide as an entrainer so that substantially pure naphthenic hydrocarbon is recovered as the residual fraction and substantially all the other constituents of the mixture, including the entrainer and some naphthenic hydrocarbon, distill overhead. The phosphorus halide is recovered and a substantially pure paraffinic hydrocarbon fraction is obtained from this overhead stream by a subsequent separation step such as solvent extraction. Serial Number 477,840, filed December 27, 1954, by Gardner C. Ray discloses and claims the use of a dialkyl sulfate as a solvent for the separation of phosphorus halides from hydrocarbons. The improved azeotropic distillation process of this invention provides a means whereby naphthenic hydrocarbons of increased purity can be separated from paraffinic hydrocarbons differing but little in boiling point from the naphthenic hydrocarbons.

The drawing illustrates in flow sheet manner an embodiment of the invention in which phosphorus trichloride is employed to separate 2,4-dimethylpentane from cyclohexane which is recovered in substantially purified form.

The entrainer of this invention comprises a phosphorus halide; phosphorus trichloride and phosphorus tribromide are specific phosphorus halides which are now preferred. Phosphorus trifluoride and phosphorus pentafluoride are not very useful in the separation processes of this invention since the boiling points of these phosphorus halides are so much lower than the boiling points of the components of the hydrocarbon mixtures which are now ordinarily separated. Phosphorus dichloride is very unstable and for this reason is not now considered to be a very satisfactory entrainer. Some of the physical properties of phosphorus trichloride and phosphorus tribromide are given in Table I.

TABLE I

*Physical properties of phosphorus halides*

|  | Phosphorus Trichloride | Phosphorus Tribromide |
|---|---|---|
| Molecular weight | 137.35 | 270.73 |
| Boiling point, C | 75.3 | 172.9 |
| Boiling point, F | 167.5 | 343.2 |
| Melting point, C | −111.8 | −40.0 |
| Melting point, F | −169.2 | −40.0 |
| Specific gravity, 60/60 | 1.585 |  |
| Specific gravity, 15/4 |  | 2.852 |
| Density, lbs./gal | 13.2 |  |
| Heat of hydrolysis, kcal./mol | 65 |  |

The azeotropic distillation process of this invention is particularly useful in separating a naphthenic hydrocarbon such as cyclohexane from a paraffinic hydrocarbon such as 2,2-dimethylpentane, 2,4-dimethylpentane, or 2,2,3-trimethylbutane; however, it is also useful for producing dimethylcyclopentane, n-hexane and 2,3-dimethylpentane in a high degree of purity from close boiling naphthenic-paraffinic fractions. Cyclohexane in a purity exceeding 95 volume percent can be separated in a distillation column from a commercial cyclohexane fraction containing 88 volume percent cyclohexane and one or more than one of the paraffinic hydrocarbons comprising 2,2-dimethylpentane, 2,4-dimethylpentane, or 2,2,3-trimethylbutane.

The separation process of this invention can also be performed as an extractive distillation process to effect the separation of close-boiling naphthenic and paraffinic hydrocarbons which do not azeotrope with the phosphorus halide entrainer. For example, a cyclopentane-neohexane mixture can be separated in an extractive distillation process in which phosphorus trichloride is used as the solvent and cyclopentane is recovered as the kettle product.

The distillation process of this invention can be performed as a batch process; however, it is usually carried out as a continuous process with the phosphorus halide, after separation from the paraffinic hydrocarbons, being continuously recycled to the distillation column. The proportion of phosphorus halide in the naphthenic-paraffinic feed to the distillation column will vary considerably and depends to some extent on the concentration or nature of the paraffinic hydrocarbons in the hydrocarbon mixture, the purity desired in the naphthenic fraction recovered, and the design and operation of the distillation column. The choice of the particular phosphorus halide employed for the distillation process will depend upon the boiling range of the hydrocarbon mixture to be separated. For example, in the azeotropic distillation process of the invention the boiling range of the hydrocarbon mixture should be within at least 60° F., and preferably within 30° F., of the boiling point of phosphorus halide.

EXAMPLE I

A blend of 96.2 volume percent cyclohexane and 3.8 volume percent 2,4-dimethylpentane was subjected to separation processes of simple fractional distillation and azeotropic distillation using phosphorus trichloride as an azeotrope former. A comparison of the results of these separations is shown in Table II.

TABLE II

Distillation of 96.2% cyclohexane–3.8% 2,4-dimethylpentane

| Charge, ml. | | | Overhead | | Hydrocarbon Overhead Vol. Percent | Composition of Kettle Product, Vol. Percent Cyclohexane |
| --- | --- | --- | --- | --- | --- | --- |
| Azeotrope Former | Hydrocarbons | Azeotrope Former | Azeotrope Former, Vol. Percent | Temp.,a °F. | | |
| None | 50 | 0 | 0 | 176.2 | 21 | b 97.0 |
| PCl$_3$ | 50 | 15 | ~75 | 166.1–168.3 | c 8 | d 97.9 | a Corrected to 760 mm.
b Based on refractive index. $n_D^{20}$ curve based on $n_D^{20}$ of feed, kettle product of azeotropic distillation and of 100% cyclohexane (lit. value).
c By difference.
d By freezing point.

EXAMPLE II

A blend of 90 volume percent cyclohexane and 10 volume percent 2,4-dimethylpentane was subjected to simple distillation and azeotropic distillation using phosphorus trichloride as the azeotrope former. A comparison of these data is given in Table III. In this example, the composition of the kettle product was determined from the distillation data given in Table IV.

TABLE III

Distillation of 90% cyclohexane–10% 2,4-dimethylpentane

| Charge, ml. | | | Overhead | | Hydrocarbon Overhead Vol. Percent | Composition b of Kettle Product, Vol. Percent Cyclohexane |
| --- | --- | --- | --- | --- | --- | --- |
| Azeotrope Former | Hydrocarbons | Azeotrope Former | Azeotrope Former, Vol. Percent | Temp.,a °F. | | |
| None | 100 | 0 | 0 | 174.9–176.4 | 7.8 | 91.3 |
| PCl$_3$ | 100 | 50 | 78–87 | 166.2–166.6 | 7.8 | 97.2 | a Corrected to 760 mm.
b Calculated from data in Table IV.

TABLE IV

Data for distillation of 90% cyclohexane–10% 2,4-dimethylpentane

| Cut | Cumulative Vol. percent of Hydrocarbon Charge— No Azeotrope Former | PCl$_3$ | Approximate Cyclohexane Concentration in Cut,a Volume Percent | | Cumulative Vol. percent of 2,4-Dimethylpentane Removed | |
| --- | --- | --- | --- | --- | --- | --- |
| | | | No Azeotrope Former | PCl$_3$ (Azeotrope Former-Free) | No Azeotrope Former | PCl$_3$ |
| 1 | 3.4 | 3.4 | 61 | 6 | 12.5 | 34 |
| 2 | 5.3 | 5.3 | 70 | 14 | 18 | 51 |
| 3 | 7.8 | 7.8 | 73 | 20 | 24 | 73 |
| 4 | 11.8 | 11.8 | 75 | b 77 | 34 | b 82 |
| Residue | 100.0 | 100.0 | 92 | 98.1 | | | a Based on refractive index.
b PCl$_3$ in column was depleted during this cut.

EXAMPLE III

A commercial cyclohexane stream containing 88.2 volume percent cyclohexane was subjected to azeotropic distillation using phosphorus trichloride as the azeotrope former in phosphorus trichloride-hydrocarbon volume ratios of 0.6 and 1.0. The data for these azeotropic distillations as well as a comparative separation employing simple distillation are given in Table V. The yield of kettle product was 87.4, 87.3 and 84.2 volume percent by simple distillation, azeotropic distillation using phosphorus trichloride in a phosphorus trichloride-hydrocarbon volume ratio of 0.6 and azeotropic distillation using phosphorus trichloride in a phosphorus trichloride-hydrocarbon volume ratio of 1.0, respectively.

TABLE V

Distillation of commercial cyclohexane

| Component | Normal Boiling Point, °F. | Composition,a Vol. Percent | Composition of Kettle Product, Vol. Percent | | |
| --- | --- | --- | --- | --- | --- |
| | | | No PCl$_3$ | 0.6 Vol. PCl$_3$— Vol. Hydrocarbon | 1.0 Vol. PCl$_3$— Vol. Hydrocarbon |
| Methylcyclopentane | 161.3 | 0.1 | (b) | b 0.0 | |
| 2,2-Dimethylpentane | 174.6 | 2.3 | | 0.3 | |
| 2,4-Dimethylpentane | 176.9 | 6.5 | | 1.1 | |
| Cyclohexane | 177.3 | 88.2 | ~91 | c 95.6 | d 97.6 |
| 3,3-Dimethylpentane | 186.9 | 0.7 | | 1.2 | |
| 1,1-Dimethylcyclopentane | 190.1 | 0.8 | | 1.0 | |
| 2,3-Dimethylpentane | 193.6 | 0.9 | | 0.6 | |
| 2-Methylhexane | 194.1 | 0.5 | | 0.2 | |
| | | 100.0 | | 100.0 | | a Average of two infrared analyses.
b Infrared analyses.
c Freezing point, 33.1 F., which corresponds to 97.6 mol percent purity.
d Freezing point, 35.6 F., which corresponds to 98.1 mol percent purity.

A partial list of binary azeotropes of phosphorus trichloride is given in Table VI:

TABLE VI

List of PCl$_3$ binary ozeotropes

| System | Normal Boiling Point of Hydrocarbon, °F. | Boiling Point of Azeotrope, °F. | Vol. Percent Hydrocarbon in Distillate |
| --- | --- | --- | --- |
| PCl$_3$-n-hexane | 155.7 | 155.5 | 92 |
| PCl$_3$-2,4-dimethylpentane | 176.9 | 165.6 | 27 |
| PCl$_3$-2,2,3-trimethylbutane | 177.6 | 166.1 | 26 |
| PCl$_3$-2,3-dimethylpentane | 193.6 | 166.1 | 1.2 |
| PCl$_3$-2,2-dimethylpentane 1 | 174.6 | 1 (165) | 1 (35) |

1 Calculated using Skolnik method for correlation of azeotropes.

Reasonable variation and modification are possible within the scope of the foregoing disclosure and the appended claims to the invention, the essence of which is that phosphorus halides, especially phosphorus trichloride and phosphorus tribromide have been provided as distillation aids in the separation by distillation of aliphatic and naphthenic hydrocarbons, more particularly the distillation separation of cyclohexane from dimethylpentanes, as described.

I claim:

1. The distillation of a mixture of an aliphatic and a close-boiling naphthenic hydrocarbon which comprises distilling the mixture in the presence of at least one of phosphorus trichloride and phosphorus tribromide.

2. A distillation according to claim 1 in which the phosphorus halide is phosphorus trichloride.

3. The distillation of a mixture comprising a paraffinic hydrocarbon and a naphthenic hydrocarbon which comprises admixing said mixture with at least one of phosphorus trichloride and phosphorus tribromide and subjecting the admixture to distillation.

4. A distillation according to claim 3 wherein the phosphorus halide is phosphorus trichloride.

5. The distillation of a mixture containing cyclohexane and at least one dimethylpentane which comprises admixing with said admixture at least one of phosphorus trichloride and phosphorus tribromide and subjecting the mixture thus obtained to distillation under conditions so as to recover cyclohexanes with increased purity as bottoms from said distillation.

6. A distillation according to claim 5 wherein said phosphorus halide is phosphorus trichloride.

7. A distillation according to claim 6 wherein the cyclohexane is present in said admixture in a preponderant proportion and wherein the ratio of phosphorus trichloride to the hydrocarbon on a volume basis is at least approximately 0.6.

8. The distillation of a mixture of dimethylcyclopentane from a close-boiling paraffinic hydrocarbon-containing mixture which comprises admixing therewith at least one of phosphorus trichloride and phosphorus tribromide entrainer and then subjecting the mixture thus obtained to distillation.

9. The distillation of a mixture of normal-hexane from a close-boiling naphthenic hydrocarbon-containing mixture which comprises admixing therewith at least one of phosphorus trichloride and phosphorus tribromide entrainer and then subjecting the mixture thus obtained to distillation.

10. The distillation of a mixture of 2,3-dimethylpentane from a close-boiling naphthenic hydrocarbon-containing mixture which comprises admixing therewith at least one of phosphorus trichloride and phosphorus tribromide entrainer and then subjecting the mixture thus obtained to distillation.

11. The distillation of a mixture of 2,4-dimethylpentane and a close-boiling naphthenic hydrocarbon which comprises admixing with said mixture at least one of phosphorus trichloride and phosphorus tribromide and subjecting the admixture thus obtained to distillation.

12. The distillation of a mixture containing cyclohexane and at least one of the following hydrocarbons: methylcyclopentane; 2,2-dimethylpentane; 2,4-dimethylpentane; 3,3-dimethylpentane; 1,1-dimethylcyclopentane; 2,3-dimethylpentane; and 2-methylhexane; which comprises admixing with said mixture at least one of phosphorus trichloride and phosphorus tribromide and subjecting the admixture thus obtained to distillation to recover as bottoms a product containing a higher percentage of cyclohexane than was contained in the original mixture.

13. A distillation according to claim 12 wherein the said phosphorus halide is phosphorus trichloride, the cyclohexane is present in said mixture in a preponderant proportion and wherein the volume ratio of phosphorus trichloride to hydrocarbon is at least approximately 0.6.

References Cited in the file of this patent

UNITED STATES PATENTS 2,463,919      Stribley et al. _____ Mar. 8, 1949